United States Patent [19]
Brown

[11] Patent Number: 5,975,167
[45] Date of Patent: Nov. 2, 1999

[54] CUTTER FOR LAND CLEARING DEVICE

[75] Inventor: Stanley L. Brown, Lenox, Iowa

[73] Assignee: Brown Bear Corporation, Corning, Iowa

[21] Appl. No.: 09/211,573

[22] Filed: Dec. 14, 1998

[51] Int. Cl.[6] ............................ B27M 1/00; A01G 23/08; A01D 34/52; B23P 11/00

[52] U.S. Cl. ............................ 144/329; 56/10.1; 56/294; 29/434; 144/34.1; 144/335; 144/306; 144/218; 144/241; 241/191.1; 241/293; 241/101.74; 241/101.77

[58] Field of Search ...................... 56/10.1, 233, 234, 56/235, 289, 294; 241/101.71, 101.74, 101.77, 193, 194, 291, 292.1, 293; 144/34.1, 4.1, 218, 241, 334, 336, 335, 329; 29/434; 83/928

[56] References Cited

U.S. PATENT DOCUMENTS 5,513,485  5/1996  Hashimoto et al. ..................... 56/294
5,642,765  7/1997  Brown ..................................... 144/34.1

*Primary Examiner*—W. Donald Bray
*Attorney, Agent, or Firm*—Zarley, McKee, Thomte, Voorhees & Seas

[57] ABSTRACT

A free-swinging cutter for use on a machine adapted to cut and clear brush and trees, including a generally stirrup-shaped member having two opposing sidewalls, a leading face with a cutting edge for cutting, and a rearward face opposite the leading face. The cutter is adapted to be swingably mounted at a point offset from its center of mass so that the cutting edge is disposed below the rearward face to form a relief heel. The invention also includes a method of creating a relief area on a cutter swingably mounted on the rotating drum to improve chip flow, which includes the steps of providing a cutter as described above and swingably mounting the cutter to a drum about an axis offset from the cutter's center of mass so that the cutting edge is disposed below the rearward face when the cutter extends radially from the drum following the rotation of the drum.

14 Claims, 4 Drawing Sheets

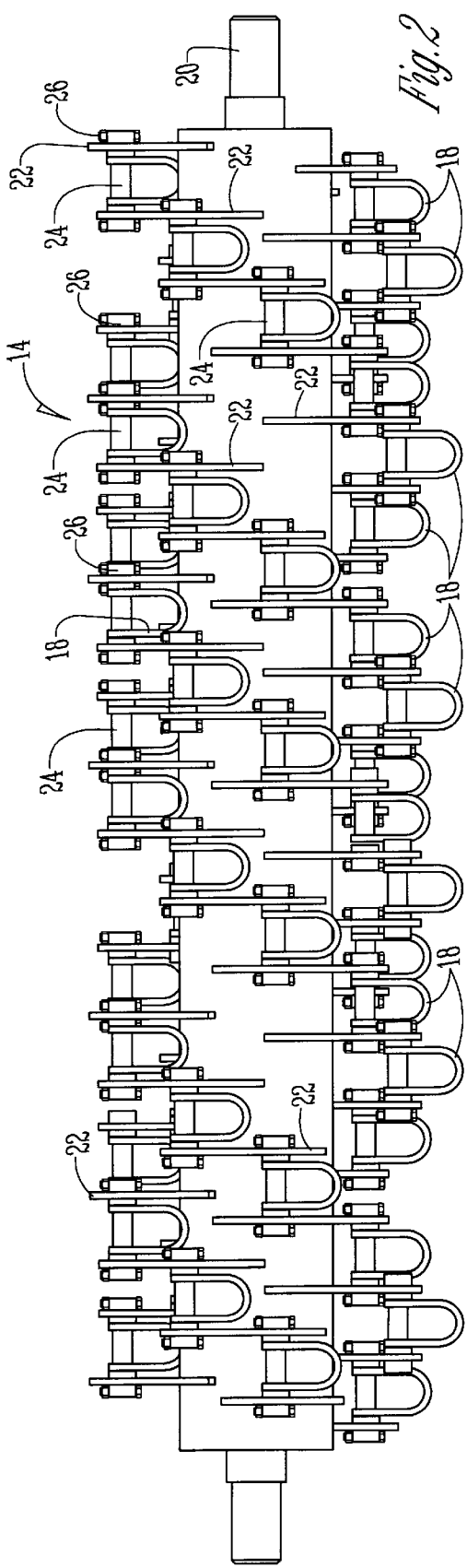
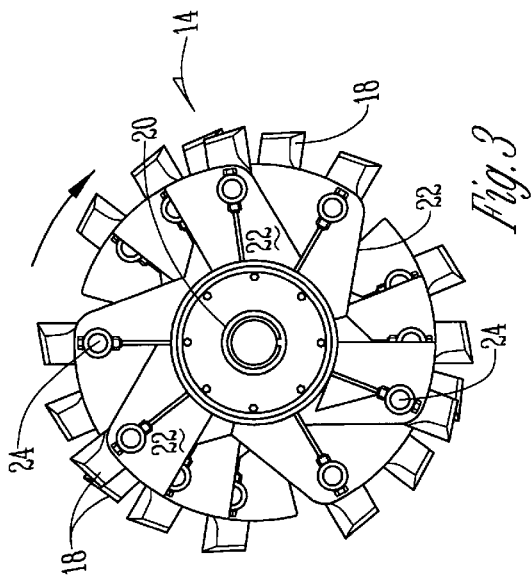
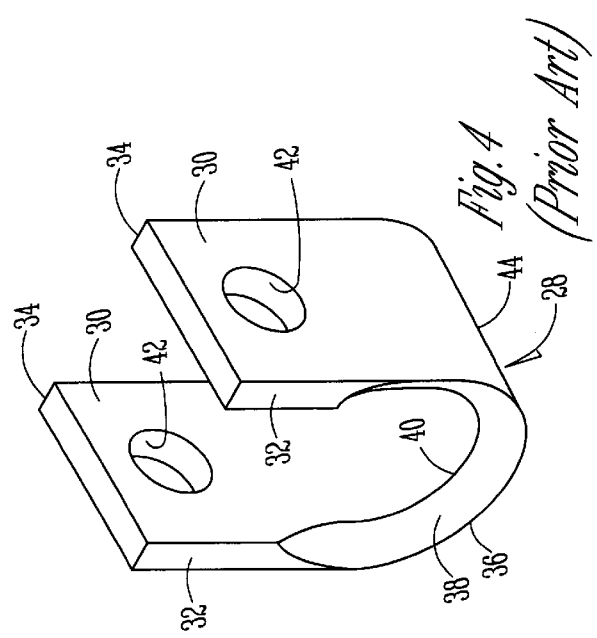
Fig. 2
Fig. 3
Fig. 4 (Prior Art)

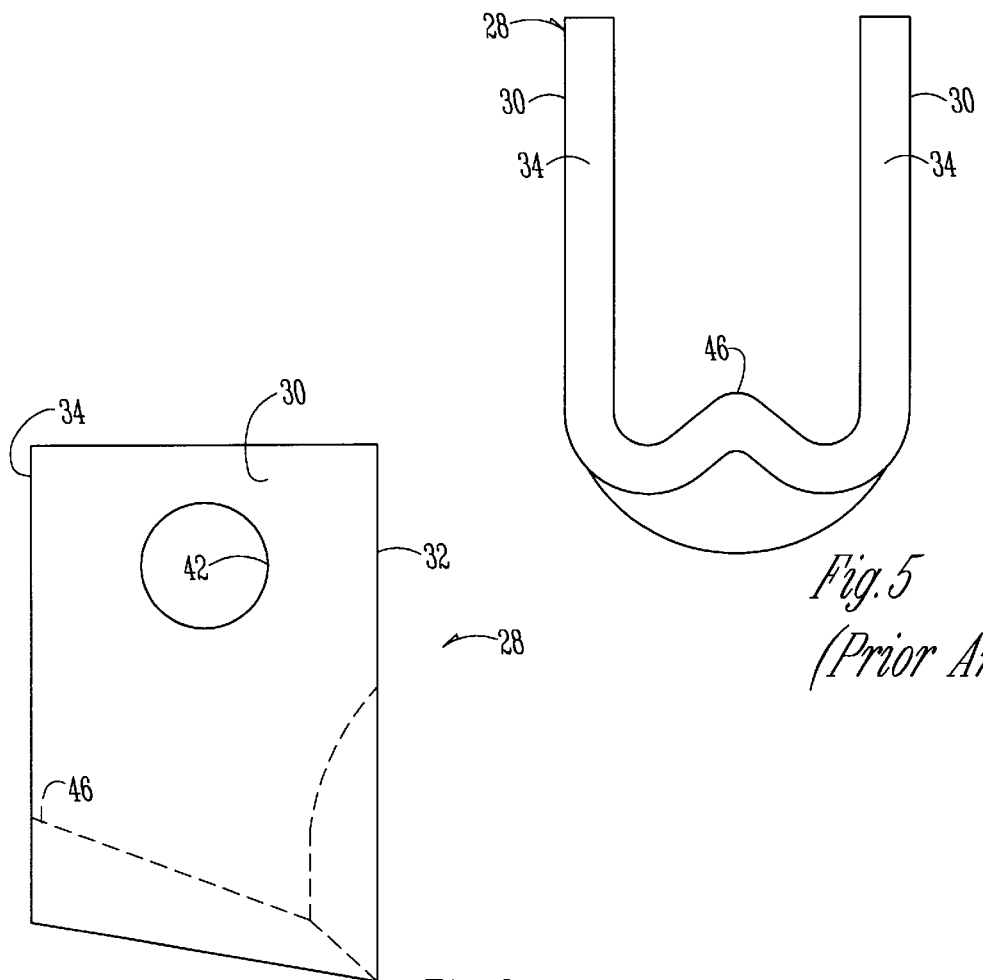
Fig. 5
(Prior Art)
Fig. 6
(Prior Art)
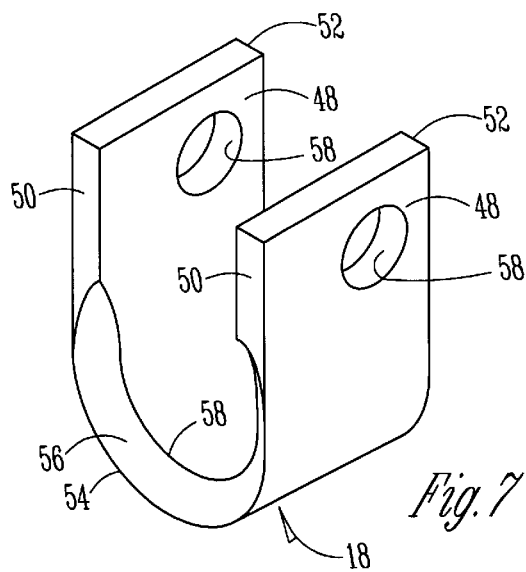
Fig. 7

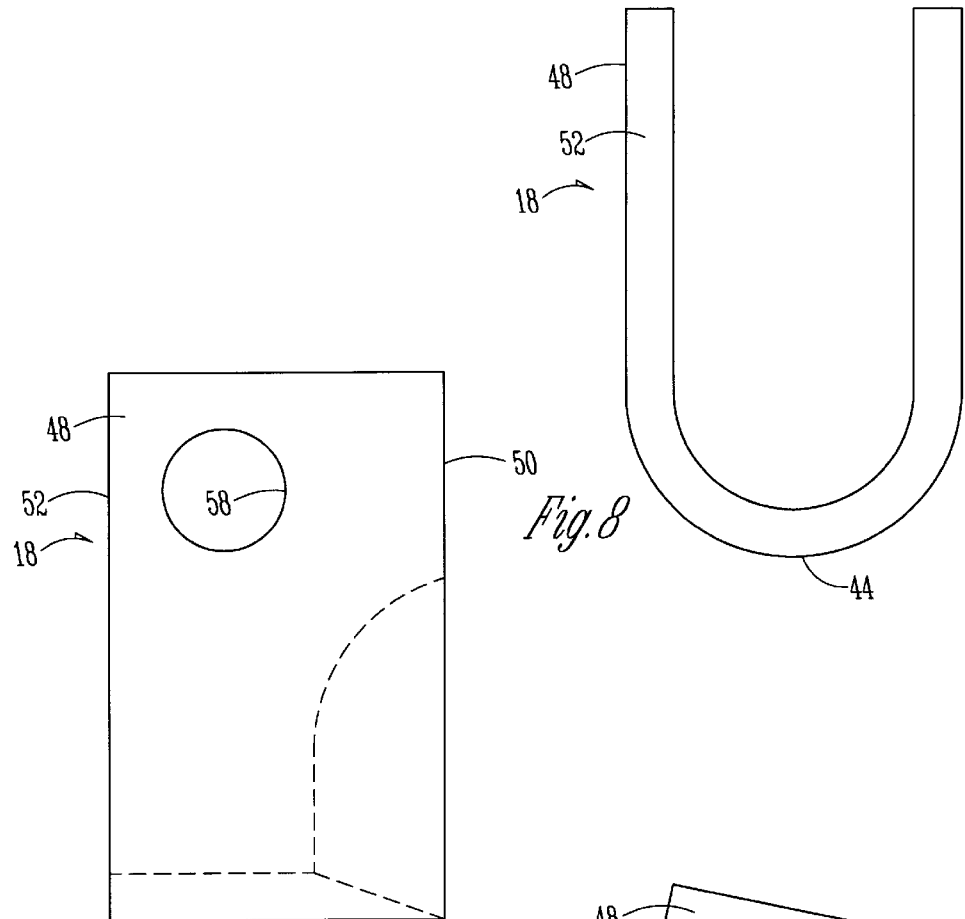
Fig. 8
Fig. 9
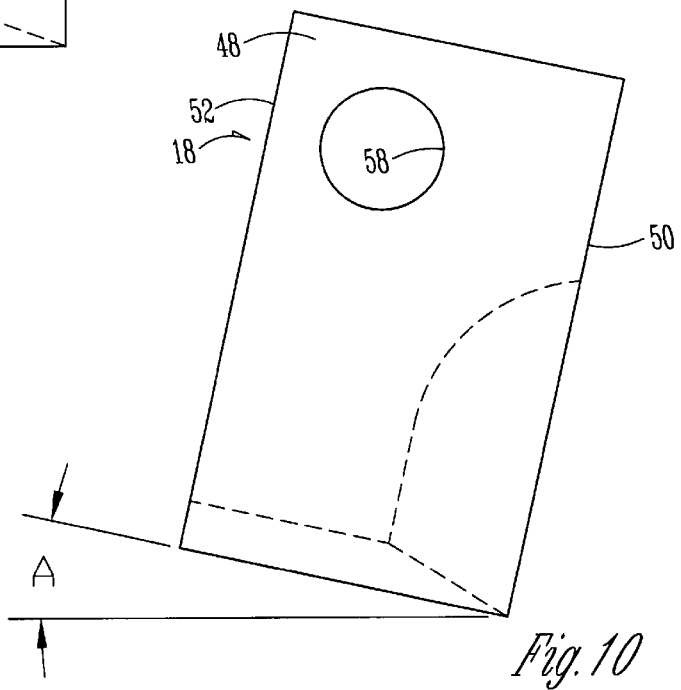
Fig. 10

CUTTER FOR LAND CLEARING DEVICE

BACKGROUND OF THE INVENTION

1. Field of the Invention

The present invention relates generally to cutting elements used with a machine for cutting and clearing such things as brush, debris and small-diameter trees. More particularly, though not exclusively, the present invention relates to a free-swinging cutter having a particular configuration that enhances its cutting efficiency without retarding chip flow.

2. Problems in the Art

Land clearing devices, also referred to as forestry shredders, are used to clear such things as utility and pipeline right-of-ways, fire lanes, construction and development sites, and recreational sites. Many prior art forestry shredders have a plurality of cutting elements or cutters swingably mounted near the periphery of a horizontal drum. In response to the rotation of the drum, the cutters engage and cut through the tree or other woody debris. The shredded material is then discharged and left to mulch to retard erosion and decompose. Typically, the drum is mounted on and driven by a heavy-duty, full-time, four-wheel drive tractor.

During the cutting operation, each cutter strikes the target and then is pushed back somewhat, but then swings forward to the correct position for the next impact during the next revolution of the drum. The leading face of the cutter has a cutting edge which impacts the wood or other debris. As the cutter passes through the cutting area, the bottom surface of the cutter tends to remain in contact with the wood, creating additional drag which diminishes the efficiency of the cutting device. It is therefore desirable to provide a relief heel on the cutter such that the cutting edge extends below the rearward face of the cutter when the cutter extends radially from the drum.

A typical cutter is machined from a flat metal plate which is bent or curved into a generally stirrup-shaped member. This is a fairly fast and inexpensive manufacturing process. Manufacturing a cutter having a relief heel, however, requires additional machine and rework operations and is a more extensive process. One solution to the problem is to simply dimple the bottom surface near the rearward face of the cutter so that it is elevated above the cutting edge. Although this design is able to utilize a flat, generally rectangular plate, the dimpled portion tends to retard chip flow through the cutter between its sidewalls. Thus, there is a need in the art for an improved cutter that can be inexpensively manufactured with a relief heel from a simple rectangular plate without significantly retarding chip flow through the cutter.

FEATURES OF THE INVENTION

A general feature of the present invention is the provision of an improved cutter which overcomes the problems found in the prior art.

A further feature of the present invention is the provision of an improved cutter that has a relief heel opposite its cutting edge.

A further feature of the present invention is the provision of an improved cutter that does not impair or retard the flow of chips through the cutter during the cutting operation.

A further feature of the present invention is the provision of an improved method for providing a relief heel on a cutter from a simple plate-like structure.

A further feature of the present invention is the provision of an improved cutter which is economical to manufacture and durable in use.

These as well as other features, objects and advantages of the present invention will become apparent from the following specification and claims.

SUMMARY OF THE INVENTION

The cutter of the present invention includes a generally stirrup-shaped member having two opposing sidewalls, a leading face with a cutting edge for cutting brush and trees, and a rearward face opposite the leading face. The cutter is adapted to be swingably mounted to a drum or similar structure about an axis substantially perpendicular to the sidewalls of the cutter. An important feature of the invention is that the cutter is mounted about an axis which is offset from the center of mass of the cutter so that the cutting edge is disposed below the rearward face of the cutter to form a relief area when the cutter extends radially from the drum. In its preferred form, the cutter is U-shaped and has apertures in both sidewalls which are aligned to receive a pin therethrough for swingably mounting the cutter to the drum.

The present invention also includes a method of creating a relief heel on a cutter swingably mounted on a rotating drum that improves chip flow through the cutter. The method generally includes the steps of providing a cutter as described above and swingably mounting the cutter to the drum about an axis offset from the center mass of the cutter so that the cutting edge is disposed below the rearward face when the cutter extends radially from the drum following the rotation of the drum. Offsetting the mounting axis from the cutter's center of mass creates a relief heel during rotation of the drum, thereby reducing drag and improving the cutting efficiency of the cutter. The present invention also eliminates the need to dimple the bottom surface of the cutter near its rearward face, thereby improving chip flow through the cutter.

BRIEF DESCRIPTION OF THE DRAWINGS

FIG. 2 is a front elevational view of a drum equipped with cutters of the present invention.

FIG. 3 is a side elevational view of the drum and cutters of FIG. 2.

FIG. 4 is a perspective view of a prior art cutter.

FIG. 5 is a front elevational view of the prior art cutter of FIG. 4.

FIG. 6 is a side elevational view of the prior art cutter of FIG. 4.

FIG. 7 is a perspective view of the cutter of the present invention.

FIG. 8 is a front elevational view of the cutter of FIG. 7.

FIG. 9 is a side elevational view of the cutter of FIG. 7.

FIG. 10 is another side elevational view of the cutter of the present invention, showing its relief heel angle.

DETAILED DESCRIPTION OF THE PREFERRED EMBODIMENT

Figure 1:
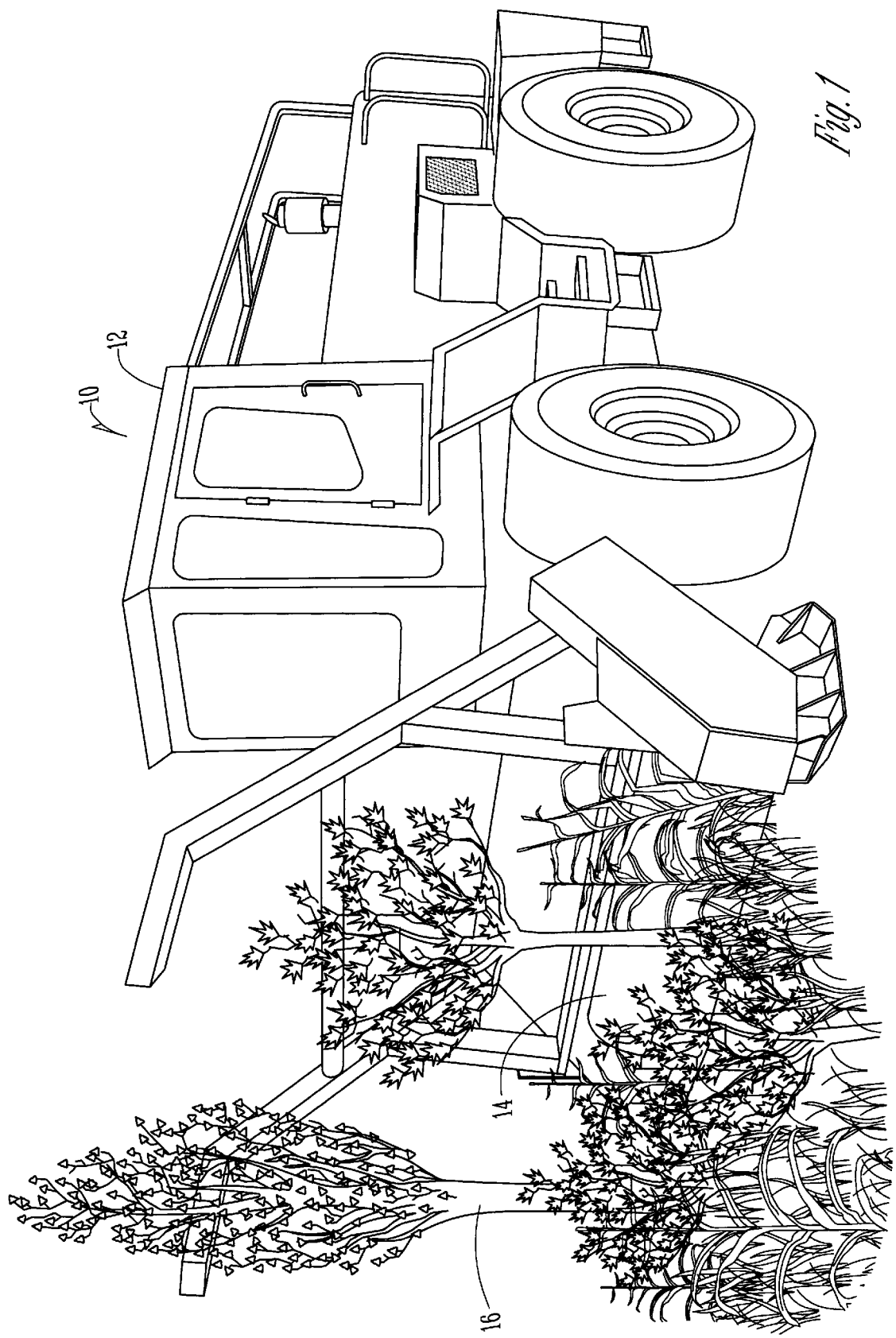
FIG. 1 is a perspective view of a tractor cutting through trees, grass and debris equipped with a cutter of the present invention.

The present invention will be described as it applies to its preferred embodiment. It is not intended that the present invention be limited to the described embodiment. It is intended that the invention cover all modifications and alternatives which may be included within the spirit and scope of the invention.

Now referring to the drawings, FIG. 1 shows a forestry shredder 10 comprising a heavy-duty, full-time, four-wheel-drive tractor 12 equipped with a horizontal drum 14. The drum 14 is driven in rotation about a horizontal axis by means such as a hydraulic motor (not shown) that is supplied with fluid under pressure by a pump on the tractor 12. The brush and small-diameter trees 16 are fed into the cutting area at the drum 14.

FIG. 2 illustrates how the cutters 18 of the present invention are mounted about the periphery of the drum 14, which in turn is mounted horizontally on a shaft 20. A plurality of anchors 22 are arranged along the periphery of the drum 14. Although the drum 14 may be made from a variety of different materials, it is preferred that the drum 14 be comprised of a machined cold drawn steel. It is also preferred that the anchors be made from a high-tensile steel with the bottom edges of the anchors 22 being welded to the drum 14. A plurality of cutters 18 are mounted individually between the facing sides of adjacent anchors 22. Each cutter 18 is swingably mounted between the anchors on pins 24 that are retained by cap screws 26. Preferably the cutters 18 are mounted independently on heat-treated alloy steel pins and retained by grade-8 cap screws.

As shown in FIG. 3, the rotation of the drum 14 creates a centrifugal force that holds the cutters 18 out in the cutting position, extending radially from the drum 14. If the material cannot be cut, the cutting element 18 rotates back between the anchors 22 for protection. Centrifugal force then repositions the cutter 18 immediately after passing the obstacle.

A common problem with prior art cutters is that the bottom surface of the cutter is forced into and remains in contact with the wood or debris, creating additional drag and generally reducing the speed and efficiency of the cutter. It is for this reason that the bottom surface is dimpled near the rearward face upward to provide a relief heel. FIGS. 4–6 illustrate such a prior art cutter 28. The prior art cutter 28 is generally U-shaped with two opposing sidewalls 30. The cutter 28 has a leading face 32 and a rearward face 34. The leading face 32 includes a first edge or cutting edge 36. The cutting edge 36 is formed by a bevel between the cutting edge 36 and a second edge 40. Both of the sidewalls 30 include apertures 42 that are aligned to receive a pin 24 for swingably mounting the cutter 28 to the drum 14. Note that the apertures 42 are also aligned substantially with the center of mass of the cutter 28 so that the bottom surface 44 of the cutter 28 remains substantially horizontal in its rest position.

As shown in FIG. 5, the bottom surface 44 includes a dimpled portion 46 toward the rearward face 34 of the prior art cutter 28. The dimpled portion 46 is formed by crimping the bottom surface 44 near the rearward face 34. As such, the lower end of the rearward face 34 extends above the cutting edge 36 to prevent the rearward face 34 from dragging against the wood or debris. However, the principal disadvantage of this prior art design is that the dimpled portion 46 tends to impede the flow of wood chips through the cutter 28 between the sidewalls 30.

The cutter 18 of the present invention solves the chip flow problem and still provides for a cutter with a relief heel in operation. The cutter 18 can also be made from a rectangular metal plate. The cutter 18 of the present invention is best shown in FIGS. 7–9. The cutter 18 preferably includes a U-shaped member having opposing sidewalls 48 and a leading face 50 opposite a rearward face 52. Similar to the cutter 28, as shown in FIGS. 4–6, the cutter 18 of the present invention includes a first edge or cutting edge 54 formed by a bevel 56 between the first edge 54 and a second edge 58.

An important feature of the cutter 18 is that the apertures 58 on the opposing sidewalls 48 are offset from the center of mass of the cutter, as shown in FIGS. 7 and 9. This causes the cutting edge 54 of the cutter 18 to extend below the rearward face 5 when the cutter 18 extends radially from the drum 14 (see FIG. 3). This in effect creates a relief heel angle 60, as shown in FIG. 10. It can be appreciated that the position of the apertures 58 will determine the relief heel angle 60. It has been found through experimentation that offsetting the apertures to create a relief heel angle of 10° is preferable for most applications. It can also be appreciated that forming the relief heel angle 60 as shown in FIG. 10 eliminates the dimpled portion in prior art cutters 28, which thereby improves the chip flow through the cutter 18 between the sidewalls 48.

Offsetting the mounting apertures 48 also allows the cutter 18 to be made from a rectangular plate which does not require further machine or rework operations to accomplish a relief heel. As such, the present invention reduces manufacturing costs and time.

From the foregoing, it can be seen that the present invention accomplishes at least all of its stated objectives.

What is claimed is:

1. A free-swinging cutter for use on a machine adapted to cut and clear brush and trees, comprising:

a generally stirrup-shaped member having two opposing sidewalls, a leading face with a cutting edge for cutting said brush and trees, and a rearward face opposite said leading face;

said cutter being adapted to be swingably mounted to said machine about an axis substantially perpendicular to said sidewalls;

said axis being offset from the center of mass of said cutter so that said cutting edge is disposed below said rearward face to form a relief area when said cutter is swingably mounted to said machine.

2. The cutter of claim 1 wherein said sidewalls having aligned apertures for swingably mounting said cutter to said machine about said axis.

3. The cutter of claim 2 wherein said apertures are adapted to receive a pin therethrough.

4. The cutter of claim 1 wherein said cutting edge is formed by a bevel in said leading face.

5. The cutter of claim 1 wherein the cutter is generally U-shaped.

6. A rotor assembly for cutting and clearing brush and trees comprising:

a drum; and a plurality of free-swinging generally stirrup-shaped cutters each having two opposing sidewalls, a leading face with a cutting edge for cutting said brush and trees, and a rearward face opposite said leading face;

said cutter being adapted to be swingably mounted to said drum about an axis substantially perpendicular to said sidewalls;

said axis being offset from the center of mass of said cutter so that said cutting edge is disposed below said rearward face to form a relief area when said cutter is swingably mounted to said drum.

7. The rotor assembly of claim 6 wherein said sidewalls having aligned apertures for swingably mounting said cutter to said drum about said axis.

8. The rotor assembly of claim 7 wherein said apertures are adapted to receive a pin therethrough.

9. The rotor assembly of claim 6 wherein said cutting edge is formed by a bevel in said leading face.

10. The rotor assembly of claim 6 wherein said cutter is generally U-shaped.

11. The rotor assembly of claim 6 wherein said cutter extends radially from said drum following the rotation of said drum.

12. A method of creating a relief heel on a cutter swingably mounted on a rotating drum and improving chip flow through the cutter, said method comprising the steps of:

providing a cutter including a generally stirrup-shaped member having two opposing sidewalls, a leading face with a cutting edge for cutting said brush and trees, and a rearward face opposite said leading face; and swingably mounting said cutter to said drum about an axis substantially perpendicular to said sidewalls and offset from the center of mass of said cutter so that said cutting edge is disposed below said rearward face when said cutter extends radially from said drum following the rotation of said drum.

13. The method of claim 12 further comprising the step of providing apertures in said sidewalls for swingably mounting said cutter.

14. The method of claim 13 further comprising the step of inserting a pin on said drum between said apertures in said sidewalls.

* * * * *